(12) United States Patent
Uematsu et al.

(10) Patent No.: US 6,719,082 B2
(45) Date of Patent: Apr. 13, 2004

(54) DEVICE FOR PREVENTING WHEEL LOCK OF VEHICLE

(75) Inventors: Koji Uematsu, Oyama (JP); Nobuki Hasegawa, Oyama (JP)

(73) Assignee: Komatsu Ltd., Tokyo (JP)

( * ) Notice: Subject to any disclaimer, the term of this patent is extended or adjusted under 35 U.S.C. 154(b) by 156 days.

(21) Appl. No.: 09/948,339

(22) Filed: Sep. 7, 2001

(65) Prior Publication Data
US 2002/0033292 A1 Mar. 21, 2002

(30) Foreign Application Priority Data

Sep. 12, 2000 (JP) ........................................ 2000-275961

(51) Int. Cl.[7] .............................................. B60K 17/35
(52) U.S. Cl. ..................... 180/249; 180/248; 303/113.1; 701/69; 701/88
(58) Field of Search ................................ 180/248, 249, 180/250, 197, 233; 303/2, DIG. 6, 186, 190, 113.1; 701/69, 88

(56) References Cited

U.S. PATENT DOCUMENTS

| | | | | |
|---|---|---|---|---|
| 3,602,553 A | * | 8/1971 | Cumming et al. | 303/186 |
| 4,700,797 A | * | 10/1987 | Leiber | 180/197 |
| 4,747,643 A | * | 5/1988 | Lanzer | 303/2 |
| 4,770,266 A | * | 9/1988 | Yamaguchi et al. | 180/197 |
| 4,805,715 A | | 2/1989 | Deike et al. | |
| 4,832,145 A | * | 5/1989 | Fujii et al. | 180/233 |
| 5,105,903 A | * | 4/1992 | Buschmann | 180/249 |
| 5,125,490 A | * | 6/1992 | Suzumura et al. | 477/35 |
| 5,215,160 A | * | 6/1993 | Williams et al. | 180/197 |
| 5,461,568 A | * | 10/1995 | Morita | 701/88 |
| 6,189,643 B1 | * | 2/2001 | Takahashi et al. | 180/248 |
| 6,336,069 B1 | * | 1/2002 | Hasegawa et al. | 701/69 |

FOREIGN PATENT DOCUMENTS

| | | | | |
|---|---|---|---|---|
| GB | 2172863 A | | 10/1986 | |
| JP | 5-58933 B2 | | 8/1993 | |
| JP | 7-53492 B2 | | 6/1995 | |
| JP | 2000326742 A | * | 11/2000 | ........... B60K/17/36 |

* cited by examiner

Primary Examiner—Lesley D. Morris
Assistant Examiner—Daniel Yeagley

(57) ABSTRACT

In a vehicle in which an engine output power is transmitted to front and rear wheels through a transmission and an inter axle differential, a wheel lock prevention device is provided. The wheel lock prevention device comprises a differential lock mechanism for locking the inter axle differential, a detection element for detecting a wheel lock state of the front and rear wheels, and an operation element for operating the differential lock mechanism so as to lock the inter axle differential by operating the differential lock mechanism upon the detection of the wheel lock state.

2 Claims, 2 Drawing Sheets

DEVICE FOR PREVENTING WHEEL LOCK OF VEHICLE

BACKGROUND OF THE INVENTION

The present invention relates to a device for preventing a wheel lock of a vehicle, and more particularly, for preventing locking of front and rear wheels of a vehicle of the type in which an engine power is distributed to the front and rear wheels by means of inter axle differential.

There have been proposed examples of such vehicle in which the engine power is distributed to the front and rear wheels by means of the inter axle differential such as disclosed in Japanese Patent Publication No. HEI 5-58933 and Japanese Patent Publication No. HEI 7-53492.

In such vehicles, the power of the engine is distributed to front and rear propeller shafts through a transmission and an inter axle differential (center differential), and the front propeller shaft drives two lateral front wheels and the rear side propeller shaft, on the other hand, drives two lateral rear wheels.

Furthermore, in these vehicles, road ability is achieved by locking the inter axle differential upon detection of slip of the wheels. However, in such vehicles, any attention is not paid at all to an occasion that the rotation of wheels is forcibly stopped (wheel lock state) by being overly braked.

SUMMARY OF THE INVENTION

An object of the present invention is to substantially eliminate defects or drawbacks encountered in the prior art mentioned above and to provide a vehicle wheel lock prevention device capable of preventing the wheel lock of a vehicle by automatically locking an inter axle differential upon detection of the wheel lock state.

This and other objects can be achieved according to the present invention by providing a device for preventing wheel lock of a vehicle in which an engine output power is transmitted to front and rear wheels of the vehicle through a transmission and an inter axle differential, the vehicle wheel lock prevention device comprising:

a differential lock mechanism for locking the inter axle differential;

means for detecting a wheel lock state of the front and rear wheels; and means for operating the differential lock mechanism so as to lock the inter axle differential by operating the differential lock mechanism upon the detection of the wheel lock state.

According to this aspect, in the case where the wheel lock is detected, inter axle differential is automatically locked, and hence, the wheel lock can be prevented. Therefore, abnormal wearing of the tires of the wheels can be effectively prevented, and moreover, the operability of the retarder brake when the vehicle provided therewith goes down a downhill slope.

In a preferred embodiment of the above aspect, the wheel lock detection means is operated to detect the wheel lock state in a case where a relative revolution number difference between a transmission output revolution number and a differential revolution number in a braking state of brakes of the front and rear wheels is more than a preliminarily set revolution number, the differential lock mechanism operating means is composed of a differential lock valve discharging a pressurized oil to the differential lock mechanism, and the differential lock valve is operated upon the detection of the wheel lock state to thereby discharge the pressurized oil.

According to this structure, the wheel lock condition is detected in comparison of the relative revolution number difference between the transmission output revolution number and the differential revolution number with the preliminarily set revolution number under the braking state of the front and rear wheels. Therefore, the wheel lock state is never detected in the brake released state. Accordingly, since the wheel lock can be surely detected and the inter axle differential is locked, the wheel lock can be surely prevented, and the inter axle differential is never erroneously locked at a time other than the wheel lock time. Further, since the differential lock mechanism is operated by the pressurized oil discharged from the differential lock valve, the differential lock mechanism may be composed of a general type hydraulic clutch.

The wheel lock detection means is provided with a plurality of preliminarily set revolution numbers and operated to generate a wheel lock signal in accordance with the wheel lock state upon the detection of the wheel lock in a case where the relative revolution number difference is more than each of the set revolution numbers stored in the wheel lock detection means, and the differential lock valve discharges the pressurized oil having a pressure in accordance with the detected wheel lock signal to the differential lock mechanism to thereby create a differential lock state in accordance with the wheel lock state.

According to this structure, the differential locking state (degree) of the inter axle differential is made in accordance with the wheel lock state and the wheel lock can be effectively prevented.

The nature and further characteristic features will be made more clear from the following descriptions made with reference to the accompanying drawings.

DESCRIPTION OF THE PREFERRED EMBODIMENT

Figure 1:
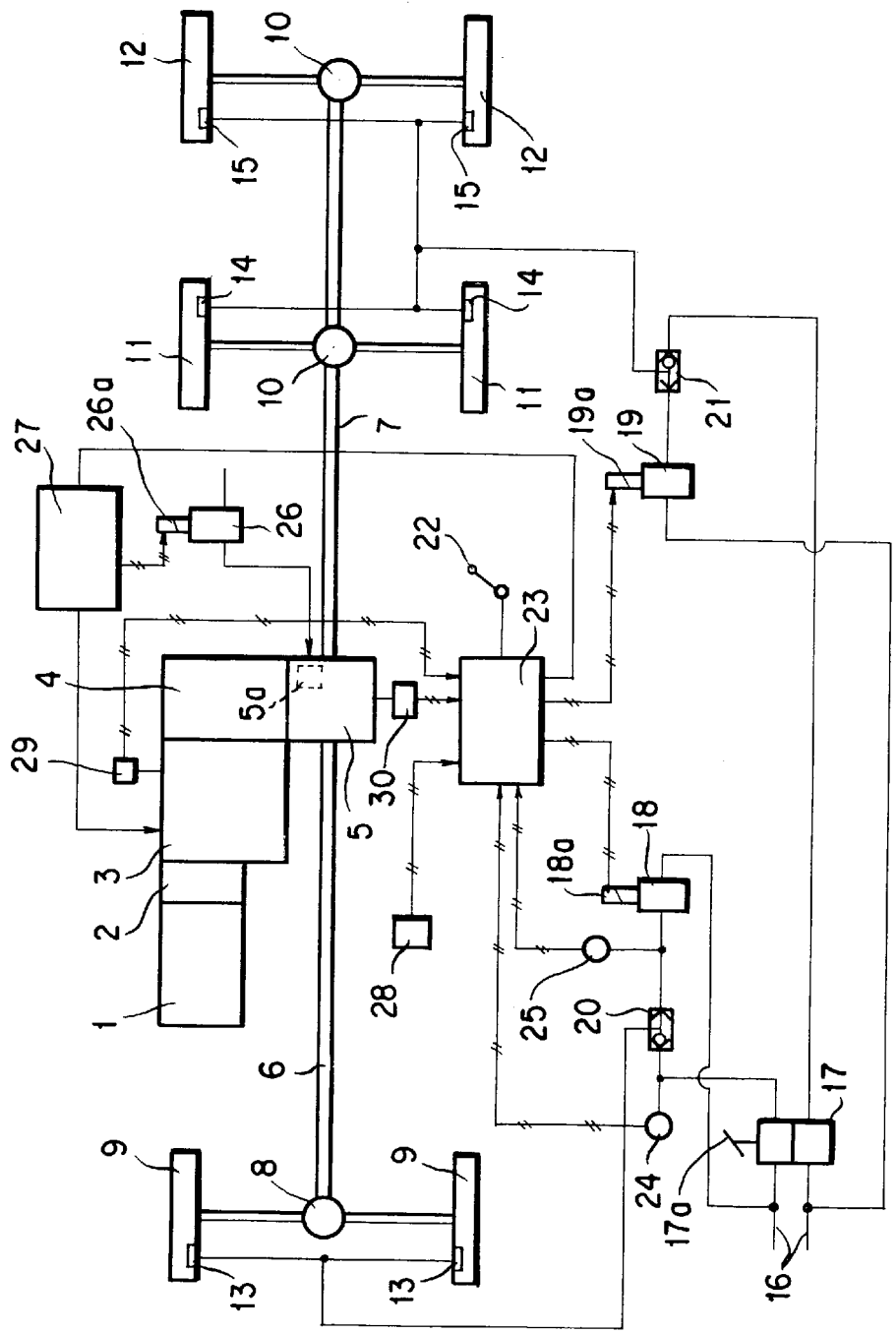
FIG. 1 is a block diagram showing an arrangement for a vehicle wheel lock prevention device of the present invention.

One preferred embodiment of the present invention will be described hereunder with reference to the accompanying drawings. Further, in an illustrated embodiment, a vehicle is equipped with a pair of front wheels 9, 9, a pair of rearward front wheels 11, 11 and a pair of rearward rear wheels 12, 12.

An engine 1 has an output side connected to an input side of a transmission 3 through a torque converter 2. The transmission 3 has an output side connected to an input side of an inter axle differential 5 by means of a transfer mechanism 4.

The inter axle differential 5 has two output sides one of which is operatively coupled to a front propeller shaft 6 and the other one of which is operatively connected to a rear propeller shaft 7. The front propeller shaft 6 is coupled to the right and left front wheels 9, 9 through a differential 8 and the rear propeller shaft 7 is also coupled with the rearward right and left front wheels 11, 11 and the rearward right and left rear wheels 12, 12 through differentials 10, 10, respectively.

The front wheels 9 are provided with a front brake 13, the rearward front wheels 11 are provided with a rearward front brake 14 and the rearward rear wheels 12 are provided with a rearward rear brake 15, and these brakes act as retarder brakes as well as foot brakes.

These brakes are operated through fluid (hydraulic) pressure from a fluid pressure source to which a fluid pressure circuit 16 is connected. This fluid pressure circuit 16 is provided with a brake valve 17, a front retarder valve 18 and a rear retarder valve 19.

The brake valve 17 has an output side which is connected to one of input sides of a front shuttle valve 20 and to one of input sides of a rear shuttle valve 21. The front retarder valve 18 has an output side which is connected to another one of input sides of the front shuttle valve 20, which has an output side connected to the front brake 13. The rear retarder valve 19 has an output side which is connected to another one of input sides of the rear shuttle valve 21, which has an output side connected to the rearward front brake 14 and rearward rear brake 15.

The brake valve 17 is controlled by means of brake pedal. The front retarder valve 18 and the rear retarder valve 19 are electromagnetic proportional pressure reducing valves generating pressures in proportion to currents conducting to solenoids 18a and 19a, respectively.

The respective brakes are controlled through the operation of the brake valve 17 by footing the brake pedal 17a, thus functioning as foot brake.

The respective brakes are also operated by means of a retarder operating member 22. That is, when the retarder operating member 22 is operated, it generates a retarder brake signal of a magnitude in proportion to the operating amount of the retarder operating member 22. This retarder brake signal is inputted into a brake controller 23, from which current of an amount proportional to the retarder brake signal is then conducted to the solenoids 18a and 19a of the front and rear retarder valves 18 and 19. In response to such current conduction, the front and rear retarder valves 18 and 19 discharge pressurized (hydraulic) oil of a pressure in accordance with the current conduction values, and therefore, the respective brakes are operated at braking force in accordance with the operating amount of the retarder operating member 22 and then act as retarder brakes.

Further, a first pressure switch 24 is incorporated in a circuit connecting the brake valve 17 and the one of the input sides of the front shuttle valve 20, and this switch 24 is made "ON", an "ON" signal therefrom is inputted into the brake controller 23.

As mentioned above, when the respective brakes are operated through the operation of the brake valve 17, the first pressure switch 24 is switched "ON" and the "ON" signal representing this "ON" state is inputted to the brake controller 23, which then detects the fact that the respective brakes are operated under the controlling of the brake valve 17. That is, the first pressure switch 24 constitutes means for detecting the fact that the respective brakes are operated as foot brakes.

Furthermore, a second pressure switch 25 is incorporated in a circuit connecting the front retarder valve 18 and the front shuttle valve 20, and this switch 25 is made "ON", an "ON" signal therefrom is also inputted into the brake controller 23.

As mentioned above, when the respective brakes are operated through the braking operation of the retarder operating member 22, the second pressure switch 25 is switched "ON" and the "ON" signal representing this "ON" state is inputted to the brake controller 23, which then detects the fact that the respective brakes are operated under the controlling of the retarder operating member 22. That is, the second pressure switch 25 constitutes means for detecting the fact that the respective brakes are operated as retarder brakes.

The inter axle differential 5 mentioned hereinbefore is provided with a differential lock mechanism 5a, which is operated to perform a deferential lock operation by supplying a pressurized oil to a hydraulic clutch as like as in a conventional technology. Accordingly, the degree of the differential lock operation is varied by the pressure of the pressurized oil, and then, the hydraulic oil is supplied through a differential valve 26 to the hydraulic clutch of the differential lock mechanism 5a.

The differential lock valve 26 is an electromagnetic proportional pressure reducing valve outputting (discharging) pressurized oil of a pressure proportional to an amount of current conducted to a solenoid 26a provided for the differential lock valve 26 by means of transmission controller 27.

A differential lock switch 28 is also provided for the brake controller 23, and when this differential lock switch 28 is operated, a differential lock signal is generated therefrom to the brake controller 23. In response to this differential lock signal, differential lock command is inputted into the transmission controller 27 from the brake controller 23 prior to the detection of the wheel lock. Thus, the differential lock switch 28 is utilized for manually releasing (preventing) the wheel lock.

The transmission controller 27 is operated to conduct the maximum current to the solenoid 26a of the differential lock valve 26, from which the maximum pressure is then outputted. The maximum pressure is supplied to the differential lock mechanism 5a mentioned hereinbefore to thereby completely lock the inter axle differential 5. That is, in other words, the differential lock valve 26 constitutes means for operating the differential lock mechanism 5a.

The output number of revolution (output rotating speed) of the transmission 3 is detected by means of transmission rotation sensor 29, which is then inputted into the brake controller 23.

The number of revolution (rotating speed) of the inter axle differential 5 is detected by a differential rotation sensor 30, which is then also inputted into the brake controller 23. This revolution number includes two numbers of revolutions on the two output sides, that is, for the front and rear propeller shafts 6 and 7.

In a usual traveling state of a vehicle, the output power of the engine 1 is distributed and transmitted through the inter axle differential 5 to the front and rear propeller shafts 6 and 7 at a predetermined distribution ratio, for example, 1:2 in the present case, whereby the front wheels 9, 9, the rearward front wheels 11, 11 and the rearward rear wheels 12, 12 are driven, respectively.

The respective brakes perform the braking operation during the usual travelling time of the vehicle by operating the brake valve 17 and the retarder operating member 22.

By the way, there may cause a case that the rotations of wheels are stopped, i.e., wheel lock case, by an excessive braking when the respective brakes are operated.

For example, when a dump track travelling with empty cargo is braked by the respective brakes particularly at a time of going down a downhill slope, the front wheels 9, 9 are applied with a large load and the rearward front wheels 11, 11 and the rearward rear wheels 12, 12 are applied with a small load. In such case, the rearward front wheels 11, 11 and the rearward rear wheels 12, 12 may be locked (wheel lock state).

In order to release or prevent an occurrence of such wheel lock, the brake controller 23 operates to detect the wheel lock state in accordance with the transmission output revolution number detected by the transmission rotation sensor 29 and the differential revolution number detected by the differential rotation sensor 30 at a time when the "ON" signal from the first pressure switch 24 or second pressure switch 25 is inputted.

More specifically, in the braking state, a difference of relative revolution number between the transmission output revolution number and the differential revolution number is compared with a set (preliminarily set) revolution number, and at a time when this difference of the relative revolution number exceeds the set revolution number, the wheel lock state is detected. That is, the wheel lock detection means is constituted by the brake controller 23, the first and second pressure switches 24, 25, the transmission rotation sensor 29 and the differential rotation sensor 30.

For example, when the rearward front wheels 11, 11 and the rearward rear wheels 12, 12 are in the wheel lock state, the number of revolution of the rear propeller shaft 7 decreases, whereas that of the front propeller shaft 6 increases. In this instance, the wheel lock state is caused at a time when the relative revolution number difference between the revolution number of the rear propeller shaft 7 (revolution number at one of output sides of the inter axle differential 5) and the transmission output revolution number becomes large and this relative revolution number difference exceeds over the set revolution number.

The wheel lock state mentioned herein includes not only a state that the wheels are completely stopped to be rotated and but also a state that they are rotated at extremely low speed just before the complete stopping thereof.

The brake controller 23 generates a differential lock command to the transmission controller 27 upon the detection of the wheel lock state mentioned above. The transmission controller 27 then generates the current conduction to the solenoid 26a of the differential lock valve 26 to thereby supply the pressurized oil to the hydraulic clutch of the differential lock mechanism and establish the differential lock state.

The front propeller shaft 6 and the rear propeller shaft 7 are coupled together through the differential lock state of the inter axle differential 5, and the power, i.e. driving torque, is distributed to the wheels now in wheel lock state, so that the wheel lock state is prevented from causing.

For example, the inter axle differential 5 is locked under the state that the rearward front wheels 11, 11 and rearward rear wheels 12, 12 are locked (wheel lock state), the power (driving torque) is distributed to the rear propeller shaft 7, and accordingly, the rearward front wheels 11, 11 and rearward rear wheels 12, 12 are rotated against the braking force, thus preventing the wheel lock state of the rear side wheels 11, 12 from causing.

Figure 2:
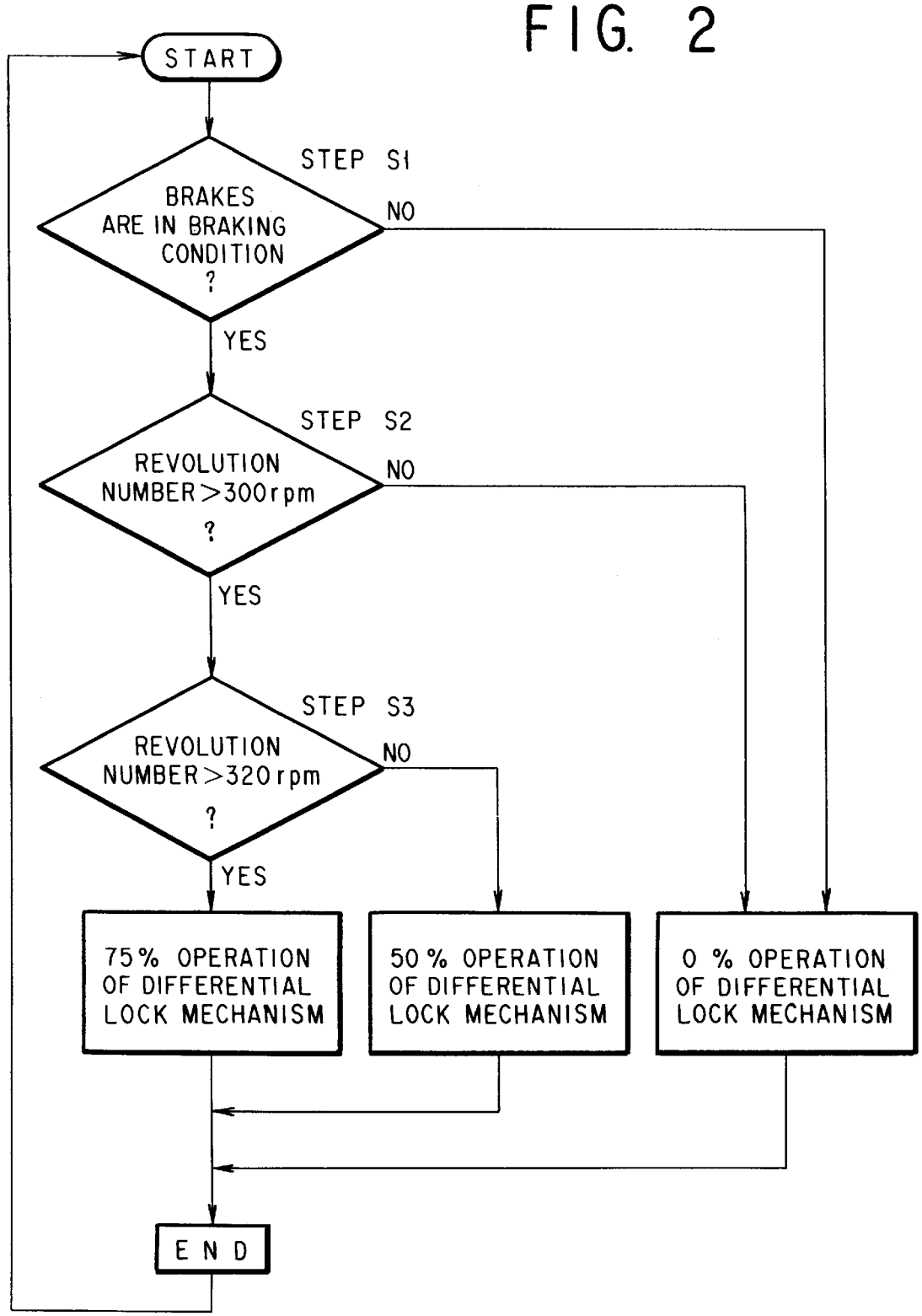
FIG. 2 is a flowchart representing an operation of an automatic wheel lock prevention according to the embodiment of the present invention.

The automatic prevention operation of causing the wheel lock state will be described hereunder with reference to flowchart of FIG. 2.

Step S1: upon the starting of the operation, in step S1, it is discriminated whether the respective brakes are in braking condition or released condition. In this case, the "braking" means the retarder braking or foot breaking. In the case of the releasing state of the respective brakes, the differential mechanism is made to 0% operation state, i.e., the differential lock mechanism is not operated, and in the case where the respective brakes are in the braking state, the operation advances to Step S2.

Step S2: in step S2, the relative revolution number difference between the transmission output revolution number and the differential revolution number and the first set revolution number (for example, 300 rpm) are compared (i.e., whether relative revolution number difference>300 rpm?).

In the case that the relative revolution number difference is smaller than the first set revolution number, the differential lock mechanism is made to 0% operation state as mentioned in the step S1, and on the other hand, in the case that the relative revolution number difference is larger than the first set revolution number, the operation advances to next step S3.

Step S3: in this step S3, the relative revolution number difference mentioned above and the second set revolution number (for example, 320 rpm) are compared (i.e., whether relative revolution number difference>320 rpm?).

In the case that the relative revolution number difference is smaller than the second set revolution number, the differential lock mechanism is made to 50% operation state. For example, in this state, the brake controller 23 shown in FIG. 1 outputs the 50% differential lock command. The transmission controller 27 is operated to conduct current of an intensity of 50% of the maximum current value to the solenoid 26a of the differential lock valve 26 to thereby make the output pressure of the differential lock valve 26 to 50% of the maximum output pressure. The differential lock mechanism does not completely operate and takes 50% operation state.

On the other hand, in the case that the relative revolution number difference is larger than the second set revolution number, the differential lock mechanism is made to 75% operation state. For example, in this state, the brake controller 23 generates the 75% differential lock command. The transmission controller 27 is operated to conduct current of an intensity of 75% of the maximum current value to the solenoid 26a of the differential lock valve 26 to thereby make the output pressure of the differential lock valve 26 to 75% of the maximum output pressure. Hence, the differential lock mechanism does not completely operate and takes 75% operation state.

According to the operation mentioned above, the differential lock condition of the inter axle differential 5 can be controlled in accordance with the wheel lock condition, and hence, the wheel lock can be effectively prevented from causing.

Further, it is to be noted that the revolution number may be set in times more than two as mentioned above, and the operation states (%) of the differential lock mechanism are not strictly limited to the values described above. Moreover, an acceleration sensor, an absolute (ground) speed sensor for the wheels or like sensor may be utilized for means for detecting the wheel lock condition.

It is further noted that, although the present invention is disclosed as an invention which is applicable to a vehicle wheel lock prevention device, the present invention is not limited to such specific embodiment or application, and many other applications will be suggested for those skilled in the art. Furthermore, it will be caused for experts in this art field to make various amendments, modifications and changes in the details of the illustrated and described embodiments so as to be conformed with design or like or with the necessity of the applications. Accordingly, it is reasonable that the present invention is understood by a method coincident with correct meaning or proper aspect of broader scopes of the appended claims.

What is claimed is:

1. A device for preventing wheel lock of a vehicle in which an engine output power is transmitted to front and rear wheels of the vehicle through a transmission and an inter axle differential, said device comprising:

a differential lock mechanism for locking said inter axle differential;

means for detecting a wheel lock state of the front and rear wheels during a braking operation of respective front and rear wheel brakes; and means for operating the differential lock mechanism so as to lock the inter axle differential by operating the differential lock mechanism upon the detection of the wheel lock state during the braking operation;

wherein said wheel lock detection means is operated to detect the wheel lock state in a case where a relative revolution number difference between a transmission output revolution number and a differential revolution number in a braking state of the respective front and rear wheel brakes is more than a set revolution number, and wherein said differential lock mechanism operating means comprises a differential lock valve that discharges pressurized oil to the differential lock mechanism, and said differential lock valve is operated upon the detection of the wheel lock state during the braking operation to thereby discharge the pressurized oil.

2. A device for preventing wheel lock of a vehicle in which an engine output power is transmitted to front and rear wheels of the vehicle through a transmission and an inter axle differential, said device comprising:

a differential lock mechanism for locking said inter axle differential;

means for detecting a wheel lock state of the front and rear wheels during a braking operation of respective front and rear wheel brakes; and means for operating the differential lock mechanism so as to lock the inter axle differential by operating the differential lock mechanism upon the detection of the wheel lock state during the braking operation;

wherein said wheel lock detection means is operated to detect the wheel lock state in a case where a relative revolution number difference between a transmission output revolution number and a differential revolution number in a braking state of the respective front and rear wheel brakes is more than a set revolution number;

wherein said differential lock mechanism operating means comprises a differential lock valve that discharges pressurized oil to the differential lock mechanism, and said differential lock valve is operated upon the detection of the wheel lock state during the braking operation to thereby discharge the pressurized oil;

wherein said wheel lock detection means stores a plurality of set revolution numbers and is operated to generate a wheel lock signal in accordance with the wheel lock state upon the detection of the wheel lock state during the braking operation in a case where said relative revolution number difference is more than each of said set revolution numbers stored in the wheel lock detection means, and wherein the pressurized oil discharged by said differential lock valve has a pressure in accordance with the detected wheel lock signal so as to create a differential lock state in accordance with the wheel lock state.

* * * * *